US012730644B2

(12) United States Patent
McClatchey et al.

(10) Patent No.: US 12,730,644 B2
(45) Date of Patent: Sep. 8, 2026

(54) SELECTING AN EXECUTABLE OPERATION FROM A LOOKUP TABLE IDENTIFIED BY A CONDITIONAL INSTRUCTION AND INDEXED BASED ON COMBINED RESULTS OF CONCURRENTLY-COMPUTED RELATIONAL OPERATORS

(71) Applicant: INTERNATIONAL BUSINESS MACHINES CORPORATION, Armonk, NY (US)

(72) Inventors: Nathaniel Joseph McClatchey, San Jose, CA (US); Andrew Stephen Cassidy, San Jose, CA (US); Arnon Amir, San Jose, CA (US); Dharmendra S. Modha, San Jose, CA (US); Jun Sawada, Austin, TX (US); Pallab Datta, San Jose, CA (US); Rathinakumar Appuswamy, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 1428 days.

(21) Appl. No.: 17/076,280

(22) Filed: Oct. 21, 2020

(65) Prior Publication Data

US 2025/0028534 A1 Jan. 23, 2025

(51) Int. Cl.

| | |
|---|---|
| ***G06F 9/32*** | (2018.01) |
| ***G06F 9/30*** | (2018.01) |
| ***G06N 3/063*** | (2023.01) |

(52) U.S. Cl.

CPC ............ *G06F 9/32* (2013.01); *G06F 9/30061* (2013.01); *G06N 3/063* (2013.01)

(58) Field of Classification Search

CPC ............... G06F 9/30021; G06F 9/3005; G06F 9/30058; G06F 9/30061; G06F 9/30076; G06F 9/32; G06F 9/3802; G06N 3/063

See application file for complete search history.

(56) References Cited

U.S. PATENT DOCUMENTS 3,766,527 A * 10/1973 Briley .................. G06F 9/3889 712/E9.05
7,590,830 B2 9/2009 Chaudhry et al.

(Continued)

FOREIGN PATENT DOCUMENTS

WO WO-0113220 A1 * 2/2001 .......... G06F 9/3861

OTHER PUBLICATIONS

Stack Overflow, "Logical sum / arithmetic / product", Jul. 2, 2011, pp. 1-2, Retrieved from the Internet < URL: https://stackoverflow.com/questions/6554477/logical-sum-arithmetic-product >.*

(Continued)

*Primary Examiner* — David J. Huisman
(74) *Attorney, Agent, or Firm* — Edward J. Wixted, III

(57) ABSTRACT

According to embodiments of the present disclosure, processor chips adapted for efficient massively-concurrent conditional computation are provided. In various embodiments, a chip comprises at least one processing core; a controller operatively coupled to the at least one processing core; and an instruction memory in communication with the controller. The controller is configured to: concurrently compute a plurality of relational operators on a plurality of inputs, resulting in a plurality of results; combine the plurality of results to determine an index; select an operation based on the index; and cause the at least one processing core to execute the selected operation.

13 Claims, 23 Drawing Sheets

(56) References Cited

U.S. PATENT DOCUMENTS

| | | | | |
|---|---|---|---|---|
| 9,367,314 | B2 | 6/2016 | Grochowski et al. | |
| 2002/0019928 | A1* | 2/2002 | Saulsbury | G06F 9/3013 712/E9.02 |
| 2007/0255933 | A1* | 11/2007 | Moyer | G06F 9/30036 712/234 |
| 2009/0240931 | A1* | 9/2009 | Coon | G06F 9/30061 712/234 |
| 2019/0354846 | A1* | 11/2019 | Mellempudi | G06N 3/063 |

OTHER PUBLICATIONS

Wikipedia, "System on a chip", Oct. 14, 2019, pp. 1-14, Retrieved from the Internet < URL: https://en.wikipedia.org/w/index.php?title=System_on_a_chip&oldid=921253595 >.*

* cited by examiner

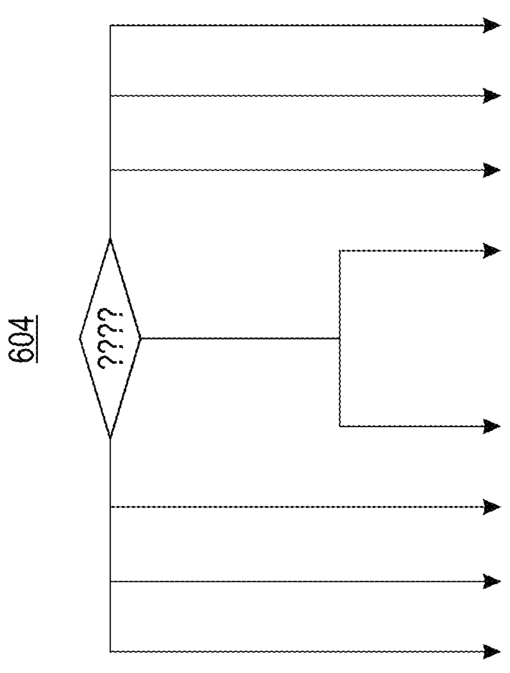
604
????
FIG. 6
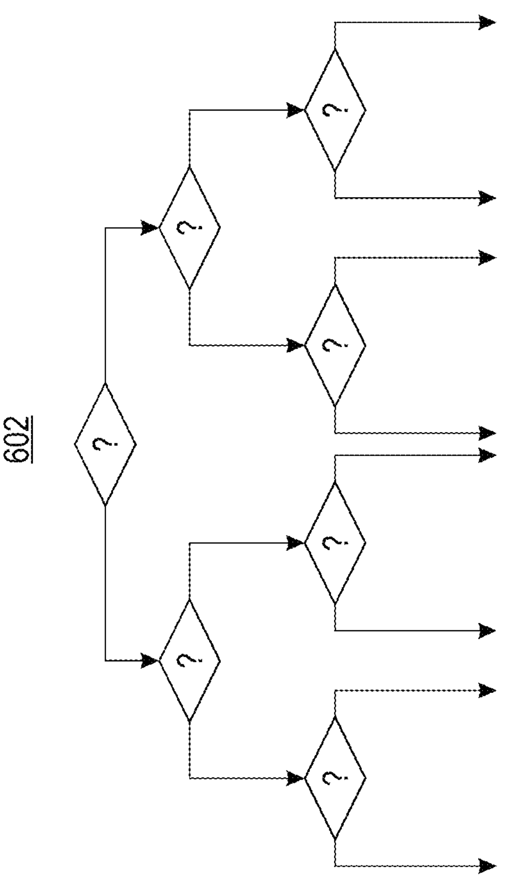
602

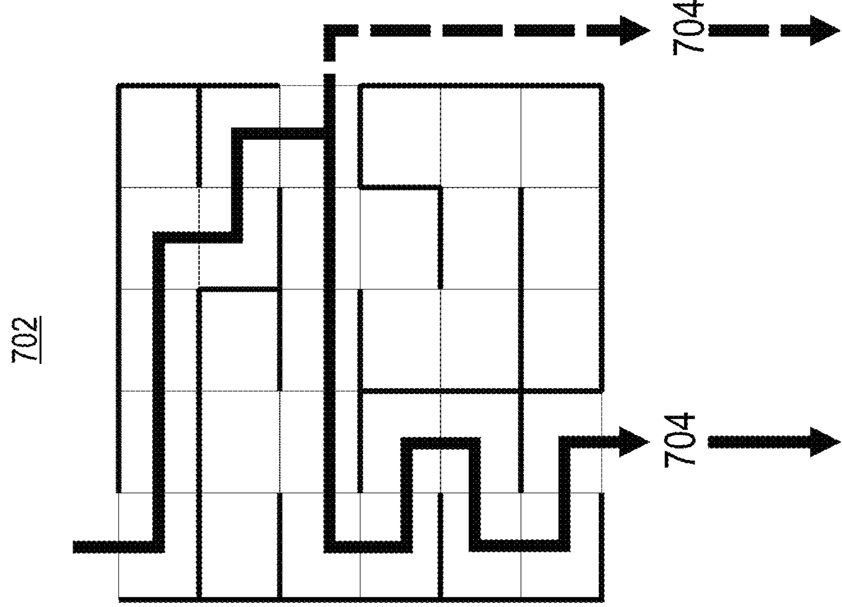
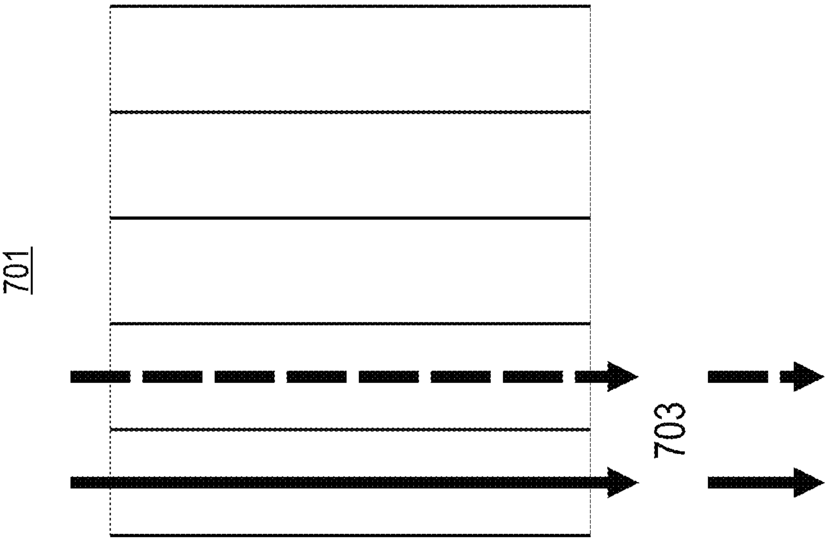
FIG. 7

Implementations:
ie / ine / ... (x86, x86-64)
beq / bne / ... (ARM)
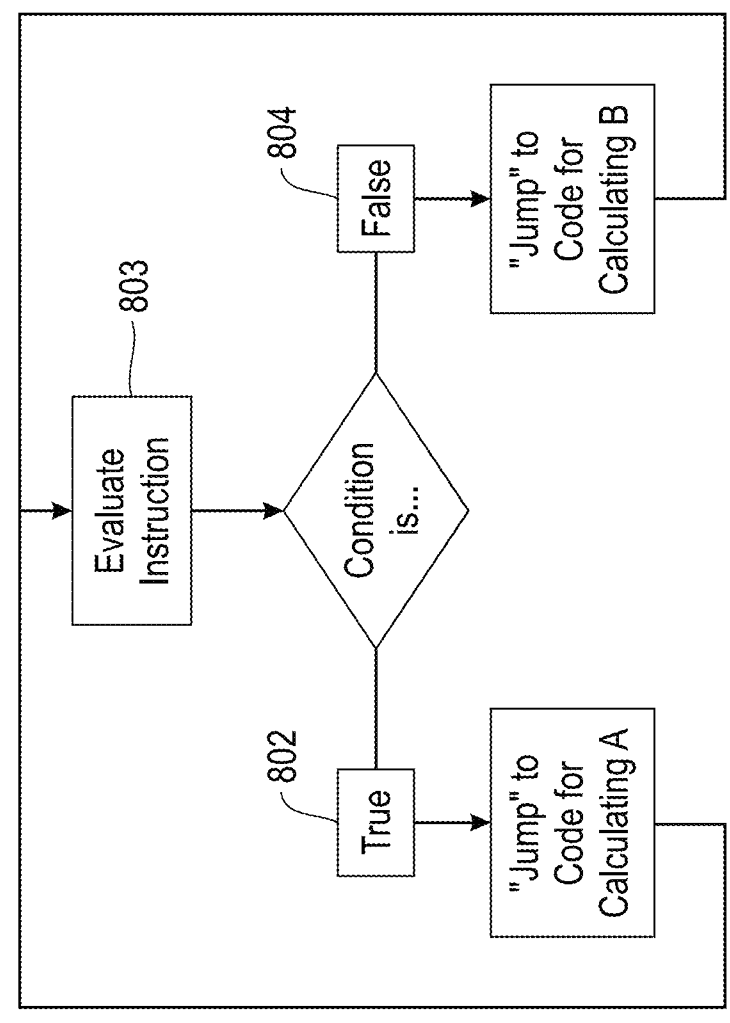
FIG. 8

1502

| Field: | Reserved | CMPR_OP | VAR1_Index | VAR0_Index |
|---|---|---|---|---|
| Width: | 1 | 1 | 1 | 1 |
| Bits: | 15 | 14:12 | 11:16 | 5:0 |

1504

| CMPR_OP | | |
|---|---|---|
| 000 | EQ | VAR1 == VAR0 |
| 001 | NEQ | VAR1 !== VAR0 |
| 010 | GT | VAR1 > VAR0 |
| 011 | GEQ | VAR1 >= VAR0 |
| 101 | ANY match | OR_REDUCE (VAR1 & VAR0) |
| 100 | ALL match | ~OR_REDUCE (VAR1 & ~VAR0) |
| 110 | ALL LOW match | ~OR_REDUCE (VAR1[3:0] & ~VAR0[3:0]) |
| 111 | ALL HIGH match | ~OR_REDUCE (VAR1[7:4] & ~VAR0[7:4]) |

1506

| VARx Index (6b) | Qty | VARx Region |
|---|---|---|
| 0...15 | 16 | User Defined (Configured) Immediate Values (8b/16b) |
| 16...31 | 16 | Loop Counters (8b) |
| 32...47 | 16 | Subindex Variables (8b/16b) |
| 48...63 | 16 | RESERVED |

| **Field:** | **Value** |
| --- | --- |
| Width: | 8 |
| Bits: | 7:0 |

for comparisons with 8b VARs

| **Field:** | **Value** |
| --- | --- |
| Width: | 16 |
| Bits: | 15:0 |

for comparisons with 16b VARs

| Field: | Reserved | C3_IDX | C2_IDX | C1_IDX | C0_IDX | COND_SET_OFFSET |
|---|---|---|---|---|---|---|
| Width: | 4 | 5 | 5 | 5 | 5 | 8 |
| Bits: | 31:28 | 27:23 | 22:18 | 17:13 | 12:8 | 7:0 |

1703

| C0_IDX: | Description |
|---|---|
| C0_IDX | Index into the SingletonConditionOpBuffer specifying the singleton condition that evaluates to bit "0" of the COND_INCREMENT for addressing into the ConditionalDatapathOpPointerBuffer |

| C1_IDX: | Description |
|---|---|
| C1_IDX | Index into the SingletonConditionOpBuffer specifying the singleton condition that evaluates to bit "1" of the COND_INCREMENT for addressing into the ConditionalDatapathOpPointerBuffer |

| C2_IDX: | Description |
|---|---|
| C2_IDX | Index into the SingletonConditionOpBuffer specifying the singleton condition that evaluates to bit "2" of the COND_INCREMENT for addressing into the ConditionalDatapathOpPointerBuffer |

| C3_IDX: | Description |
|---|---|
| C3_IDX | Index into the SingletonConditionOpBuffer specifying the singleton condition that evaluates to bit "3" of the COND_INCREMENT for addressing into the ConditionalDatapathOpPointerBuffer |

1704

| COND_SET_OFFSET | Description |
|---|---|
| | Base offset to add to COND_INCREMENT to form the COND_RESULT_ADDRESS into the ConditionalDatapathOpPointerBuffer |

| Field: | RESERVED | OP_TYPE | DATA_OP_PTR |
|---|---|---|---|
| Width: | 2 | 1 | 5 |
| Bits: | 7:6 | 5 | 4:0 |

1803

| OP_TYPE | Description |
|---|---|
| 0 | NOP |
| 1 | DATA_OP |

| DATA_OP_PTR | Description |
|---|---|
| | Pointer into DatapathOpBuffer of DATA_OP to execute |

| C3 C2 C1 C0 | OP_TYPE | DATA_OP_PTR |
|---|---|---|
| 1111 | 1 | OP1_ptr |
| 1110 | 1 | OP1_ptr |
| 1101 | 1 | OP2_ptr |
| 1100 | 1 | OP2_ptr |
| 1011 | 1 | OP3_ptr |
| 1010 | 1 | OP3_ptr |
| 1001 | 1 | OP3_ptr |
| 1000 | 1 | OP3_ptr |
| 0111 | 1 | OP4_ptr |
| 0110 | 1 | OP5_ptr |
| 0101 | 1 | OP4_ptr |
| 0100 | 1 | OP6_ptr |
| 0011 | 0 | -- |
| 0010 | 0 | -- |
| 0001 | 0 | -- |
| 0000 | 0 | -- |

2004

| C1 C1 C1 C0 | OP_TYPE | DATA_OP_PTR |
|---|---|---|
| 1111 | 1 | OP1_ptr |
| 1110 | 1 | OP2_ptr |
| 1101 | N/A | |
| 1100 | N/A | |
| 1011 | N/A | |
| 1010 | N/A | |
| 1001 | N/A | |
| 1000 | N/A | |
| 0111 | N/A | |
| 0110 | N/A | |
| 0101 | N/A | |
| 0100 | N/A | |
| 0011 | N/A | |
| 0010 | N/A | |
| 0001 | 0 | -- |
| 0000 | 0 | -- |

2104

| ZV ZV C1 C0 | OP_TYPE | DATA_OP_PTR |
|---|---|---|
| 1111 | N/A | |
| 1110 | N/A | |
| 1101 | N/A | |
| 1100 | N/A | |
| 1011 | N/A | |
| 1010 | N/A | |
| 1001 | N/A | |
| 1000 | N/A | |
| 0111 | N/A | |
| 0110 | N/A | |
| 0101 | N/A | |
| 0100 | N/A | |
| 0011 | 1 | OP1_ptr |
| 0010 | 1 | OP2_ptr |
| 0001 | 0 | -- |
| 0000 | 0 | -- |

SELECTING AN EXECUTABLE OPERATION FROM A LOOKUP TABLE IDENTIFIED BY A CONDITIONAL INSTRUCTION AND INDEXED BASED ON COMBINED RESULTS OF CONCURRENTLY-COMPUTED RELATIONAL OPERATORS

STATEMENT REGARDING FEDERALLY SPONSORED RESEARCH OR DEVELOPMENT

This invention was made with Government support under Contract No. FA8750-18-C-0015 awarded by the U.S. Air Force, Office of Scientific Research. The Government has certain rights to this invention.

BACKGROUND

Embodiments of the present disclosure relate to processor design, and more specifically, to efficient operation of massively-concurrent conditional computation.

BRIEF SUMMARY

According to embodiments of the present disclosure, processor chips are provided. In various embodiments, a chip comprises at least one processing core; a controller operatively coupled to the at least one processing core; and an instruction memory in communication with the controller. The controller is configured to: concurrently compute a plurality of relational operators on a plurality of inputs, resulting in a plurality of results; combine the plurality of results to determine an index; select an operation based on the index; and cause the at least one processing core to execute the selected operation.

According to embodiments of the present disclosure, methods of and computer program products for conditional computation are provided. A plurality of relational operators is concurrently computed on a plurality of inputs, resulting in a plurality of results. The plurality of results is combined to determine an index. An operation is selected based on the index. The selected operation is executed by at least one processing core.

BRIEF DESCRIPTION OF THE SEVERAL VIEWS OF THE DRAWINGS

FIG. 6 illustrates exemplary decision trees, according to embodiments of the present disclosure.

FIG. 7 illustrates an exemplary parallel computation, according to embodiments of the present disclosure.

FIG. 8 illustrates an exemplary conditional jump approach, according to embodiments of the present disclosure.

FIG. 15 illustrates an exemplary singleton condition operating condition, according to embodiments of the disclosure.

FIG. 16 illustrates an exemplary singleton constant register definition, according to embodiments of the disclosure.

FIG. 17 illustrates another exemplary conditional operation, according to embodiments of the disclosure.

FIG. 18 illustrates an exemplary conditional data path operation pointer buffer, according to embodiments of the disclosure.

DETAILED DESCRIPTION

Figure 1:
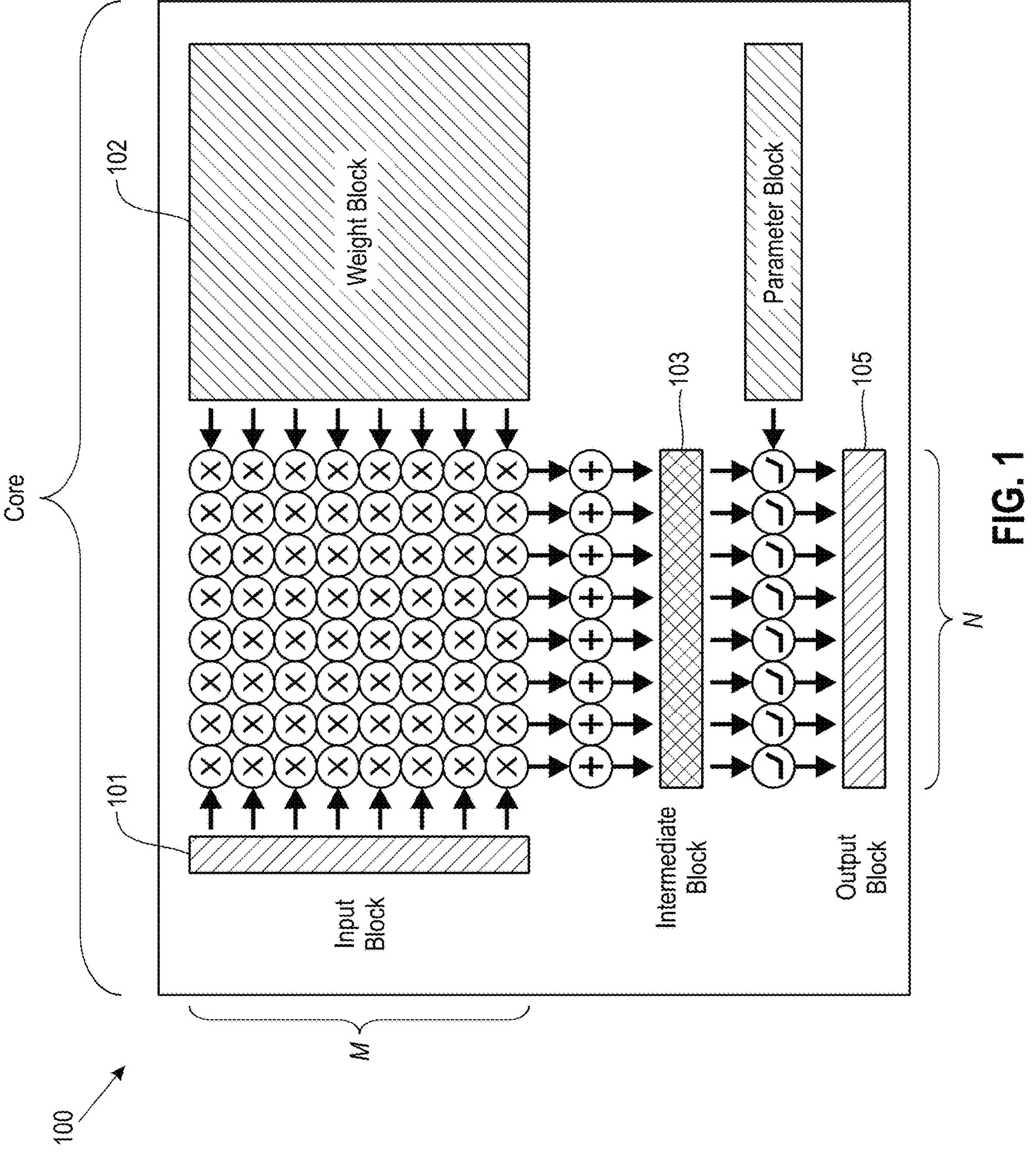
FIG. 1 illustrates a neural core according to embodiments of the present disclosure.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor block is a contiguous subarray of the elements in a tensor.

Each neural network layer is associated with a parameter tensor V, weight tensor W, input data tensor X, output data tensor Y, and intermediate data tensor Z. The parameter tensor contains all of the parameters that control neuron activation functions $\sigma$ in the layer. The weight tensor contains all of the weights that connect inputs to the layer. The input data tensor contains all of the data that the layer consumes as input. The output data tensor contains all of the data that the layer computes as output. The intermediate data tensor contains any data that the layer produces as intermediate computations, such as partial sums.

The data tensors (input, output, and intermediate) for a layer may be 3-dimensional, where the first two dimensions may be interpreted as encoding spatial location and the third dimension as encoding different features. For example, when a data tensor represents a color image, the first two dimensions encode vertical and horizontal coordinates within the image, and the third dimension encodes the color at each location. Every element of the input data tensor X can be connected to every neuron by a separate weight, so the weight tensor W generally has 6 dimensions, concatenating the 3 dimensions of the input data tensor (input row a, input column b, input feature c) with the 3 dimensions of the output data tensor (output row i, output column j, output feature k). The intermediate data tensor Z has the same shape as the output data tensor Y. The parameter tensor V concatenates the 3 output data tensor dimensions with an additional dimension o that indexes the parameters of the activation function σ. In some embodiments, activation function σ requires no additional parameters, in which case the additional dimension is unnecessary. However, in some embodiments, activation function σ requires at least one additional parameter, which appears in dimension o.

An element of a layer's output data tensor Y can be computed as in Equation 1 where the neuron activation function σ is configured by the vector of activation function parameters V[i, j, k, :], and the weighted sum Z[i, j, k] can be computed as in Equation 2.

$$Y[i, j, k] = \sigma(V[i, j, k, :]; Z[i, j, k]) \quad \text{Equation 1}$$

$$Z[i, j, k] = \sum_{a=1}^{A}\sum_{b=1}^{B}\sum_{c=1}^{C} W[i, j, k, a, b, c] \cdot X[a, b, c] \quad \text{Equation 2}$$

For simplicity of notation, the weighted sum in Equation 2 may be referred to as the output, which is equivalent to using a linear activation function Y[i, j, k]=σ(Z[i, j, k])=Z[i, j, k], with the understanding that the same statements apply without loss of generality when a different activation function is used.

In various embodiments, computation of the output data tensor as described above is decomposed into smaller problems. Each problem may then be solved on one or more neural core, or on one or more core of a conventional multicore system in parallel.

It will be apparent from the above that neural networks are parallel structures. Neurons in a given layer receive inputs, X with elements $x_i$ from one or more layers or other inputs. Each neuron computes its state, $y \in Y$ based on the inputs and weights W with elements $w_i$. In various embodiments, the weighed sum of inputs is adjusted by a bias b, and then the result is passed to a nonlinearity F(•). For example, a single neuron activation may be expressed as $y=F(b+\Sigma x_i w_i)$.

Because all neurons in a given layer receive inputs from the same layers and compute their outputs independently, neuron activations can be computed in parallel. Because of this aspect of the overall neural network, performing computation in parallel distributed cores accelerates overall computation. Further, within each core vector operations can be computed in parallel. Even with recurrent inputs, for example when a layer projects back to itself, all neurons are still updated simultaneously. Effectively, the recurrent connections are delayed to align with a subsequent input to the layer.

With reference now to FIG. 1, a neural core according to embodiments of the present disclosure is depicted. A neural core 100 is a tileable computational unit that computes one block of an output tensor. A neural core 100 has M inputs and N outputs. In various embodiments, M=N. To compute an output tensor block, a neural core multiplies an M×1 input tensor block 101 with an M×N weight tensor block 102 and accumulates the products into weighted sums that are stored in a 1×N intermediate tensor block 103. A O×N parameter tensor block contains the O parameters that specify each of the N neuron activation functions that are applied to the intermediate tensor block 103 to produce a 1×N output tensor block 105.

Multiple neural cores may be tiled in a neural core array. In some embodiments, the array is 2-dimensional.

A neural network model is a set of constants that collectively specify the entire computation performed by a neural network, including the graph of connections between neurons as well as the weights and activation function parameters for every neuron. Training is the process of modifying the neural network model to perform a desired function. Inference is the process of applying a neural network to an input to produce an output, without modifying the neural network model.

An inference processing unit is a category of processors that perform neural network inference. A neural inference chip is a specific physical instance of an inference processing unit.

Figure 2:
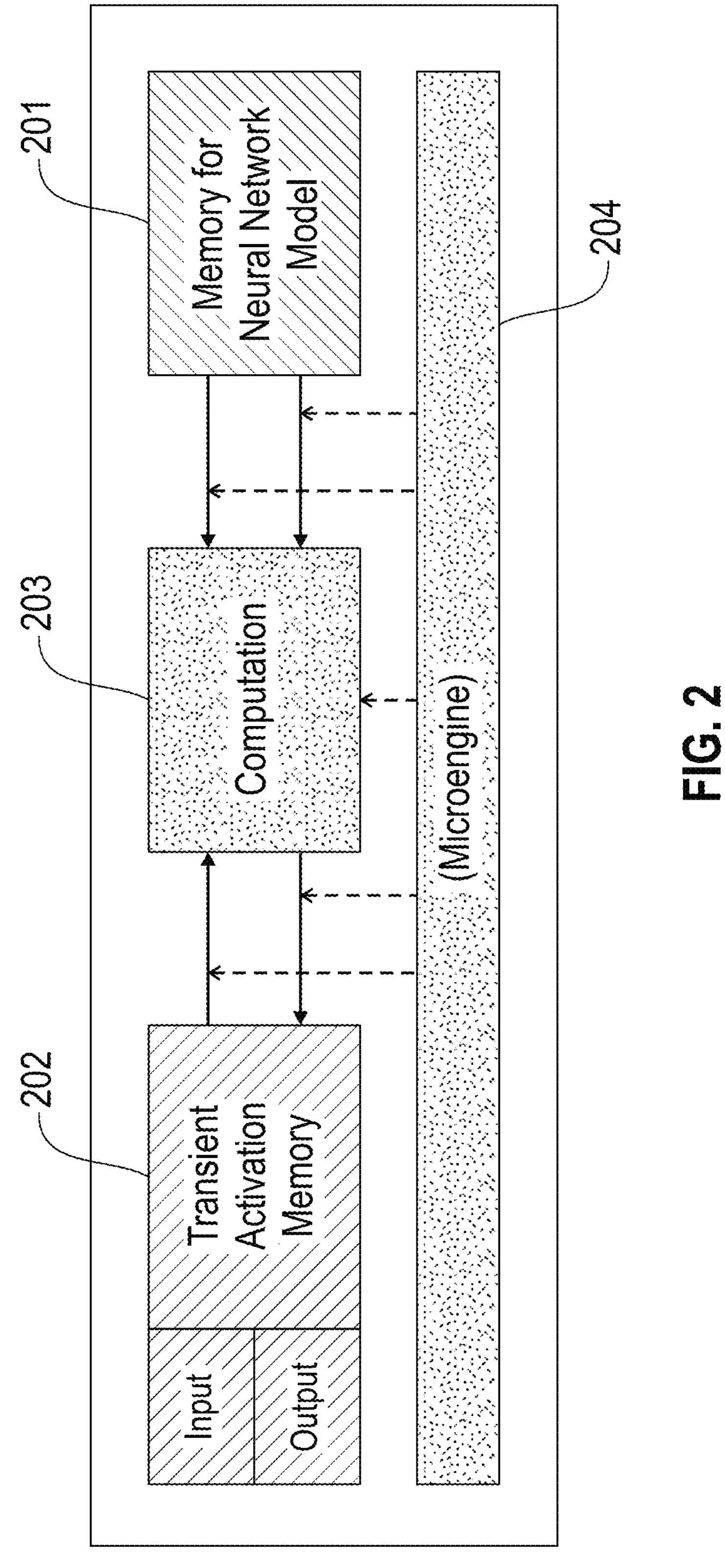
FIG. 2 illustrates an exemplary Inference Processing Unit (IPU) according to embodiments of the present disclosure.

Referring to FIG. 2, an exemplary Inference Processing Unit (IPU) is illustrated according to embodiments of the present disclosure. IPU 200 includes a memory 201 for the neural network model. As described above, the neural network model may include the synapse weights for a neural network to be computed. IPU 200 includes an activation memory 202, which may be transient. Activation memory 202 may be divided into input and output regions, and stores neuron activations for processing. IPU 200 includes a neural computation unit 203, which is loaded with a neural network model from model memory 201. Input activations are provided from activation memory 202 in advance of each computation step. Outputs from neural computation unit 203 are written back to activation memory 202 for processing on the same or another neural computation unit.

In various embodiments a microengine 204 is included in IPU 200. In such embodiments, all operations in the IPU are directed by the microengine. As set out below, central and/or distributed microengines may be provided in various embodiments. A global microengine may be referred to as a chip microengine, while a local microengine may be referred to as a core microengine or local controller. In various embodiments a microengine comprises one or more microengines, microcontrollers, state machines, CPUs, or other controllers.

Figure 3:
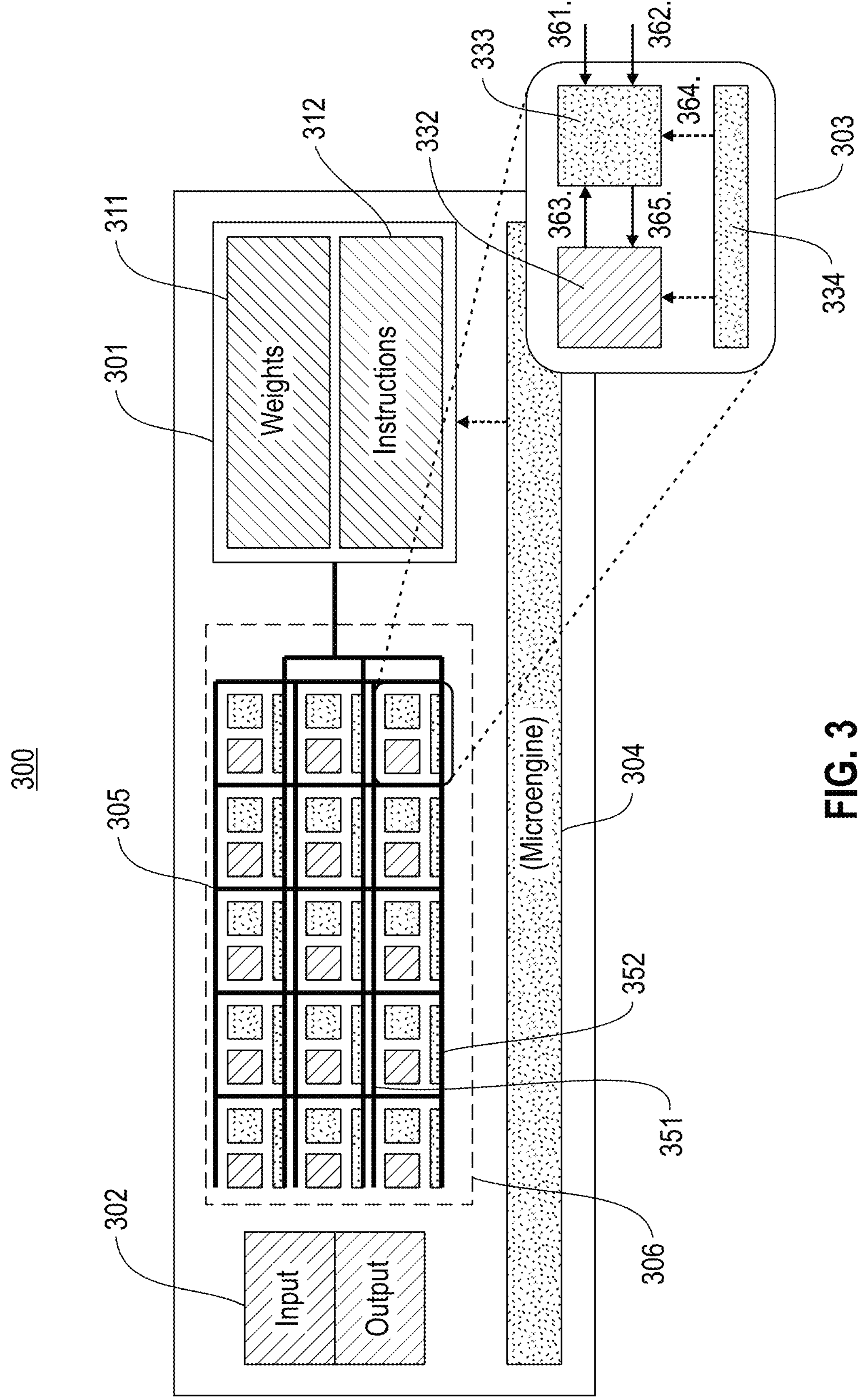
FIG. 3 illustrates a multi-core Inference Processing Unit (IPU) according to embodiments of the present disclosure.

Referring to FIG. 3, a multi-core Inference Processing Unit (IPU) is illustrated according to embodiments of the present disclosure. IPU 300 includes a memory 301 for the neural network model and instructions. In some embodiments, memory 301 is divided into weight portion 311 and instruction portion 312. As described above, the neural network model may include the synapse weights for a neural network to be computed. IPU 300 includes an activation memory 302, which may be transient. Activation memory 302 may be divided into input and output regions, and stores neuron activations for processing.

IPU 300 includes an array 306 of neural cores 303. Each core 303 includes a computation unit 333, which is loaded with a neural network model from model memory 301 and is operative to perform vector computation. Each core also includes a local activation memory 332. Input activations are provided from local activation memory 332 in advance of each computation step. Outputs from computation unit 333 are written back to activation memory 332 for processing on the same or another computation unit.

IPU 300 includes one or more network-on-chip (NoC) 305. In some embodiments, a partial sum NoC 351 interconnects the cores 303 and transports partial sums among them. In some embodiments, a separate parameter distribution NoC 352 connects cores 303 to memory 301 for distributing weights and instructions to cores 303. It will be appreciated that various configurations of NoC 351 and 352 are suitable for use according to the present disclosure. For example, broadcast networks, row broadcast networks, tree networks, and switched networks may be used.

In various embodiments a global microengine 304 is included in IPU 300. In various embodiments, a local core controller 334 is included on each core 303. In such embodiments, the global microengine (chip microengine) and the local core controller (core microengine) collaboratively direct operations. In particular, at 361, compute instructions are loaded from instruction portion 312 of model memory 301 to the core controller 334 on each core 303 by global microengine 304. At 362, parameters (e.g., neural network/synaptic weights) are loaded from weight portion 311 of model memory 301 to the neural computation unit 333 on each core 303 by global microengine 304. At 363, neural network activation data are loaded from activation local activation memory 332 to neural computation unit 333 on each core 303 by local core controller 334. As noted above, the activations are provided to the neurons of the particular neural network defined by the model, and may originate from the same or another neural computation unit, or from outside the system. At 364, neural computation unit 333 performs the computation to generate output neuron activations as directed by local core controller 334. In particular, the computation comprises applying the input synaptic weights to the input activations. It will be appreciated that various methods are available for performing such computations, including in silico dendrites, as well as vector multiplication units. At 365, the results from computation are stored in local activation memory 332 as directed by local core controller 334. As described above, these stages may be pipelined, in order to provide efficient usage of the neural computation unit on each core. It will also be appreciated that inputs and outputs may be transferred from local activation memory 332 to global activation memory 302 according to the requirements of a given neural network.

Accordingly, the present disclosure provides for runtime control of operations in an Inference Processing Unit (IPU). In some embodiments, the microengine is centralized (single microengine). In some embodiments, the IPU computation is distributed (performed by an array of cores). In some embodiments, runtime control of operations is hierarchical-both a central microengine and distributed microengines participate.

The microengine or microengines direct the execution of all operations in the IPU. Each microengine instruction corresponds to several sub-operations (e.g., address generation, load, compute, store, etc.) Core microcode is run on the core microengines (e.g., 334). In the case of local computation, the core microcode includes instruction(s) to execute a full, single tensor operation. For example, a convolution between a weight tensor and a data tensor. In the case of distributed computation, the core microcode includes instruction(s) to execute a single tensor operation on the locally stored subset of the data tensor (and partial sums). Chip microcode is run on the chip microengine (e.g., 304). Microcode includes instructions to execute all of the tensor operations in a neural network.

Figure 4:
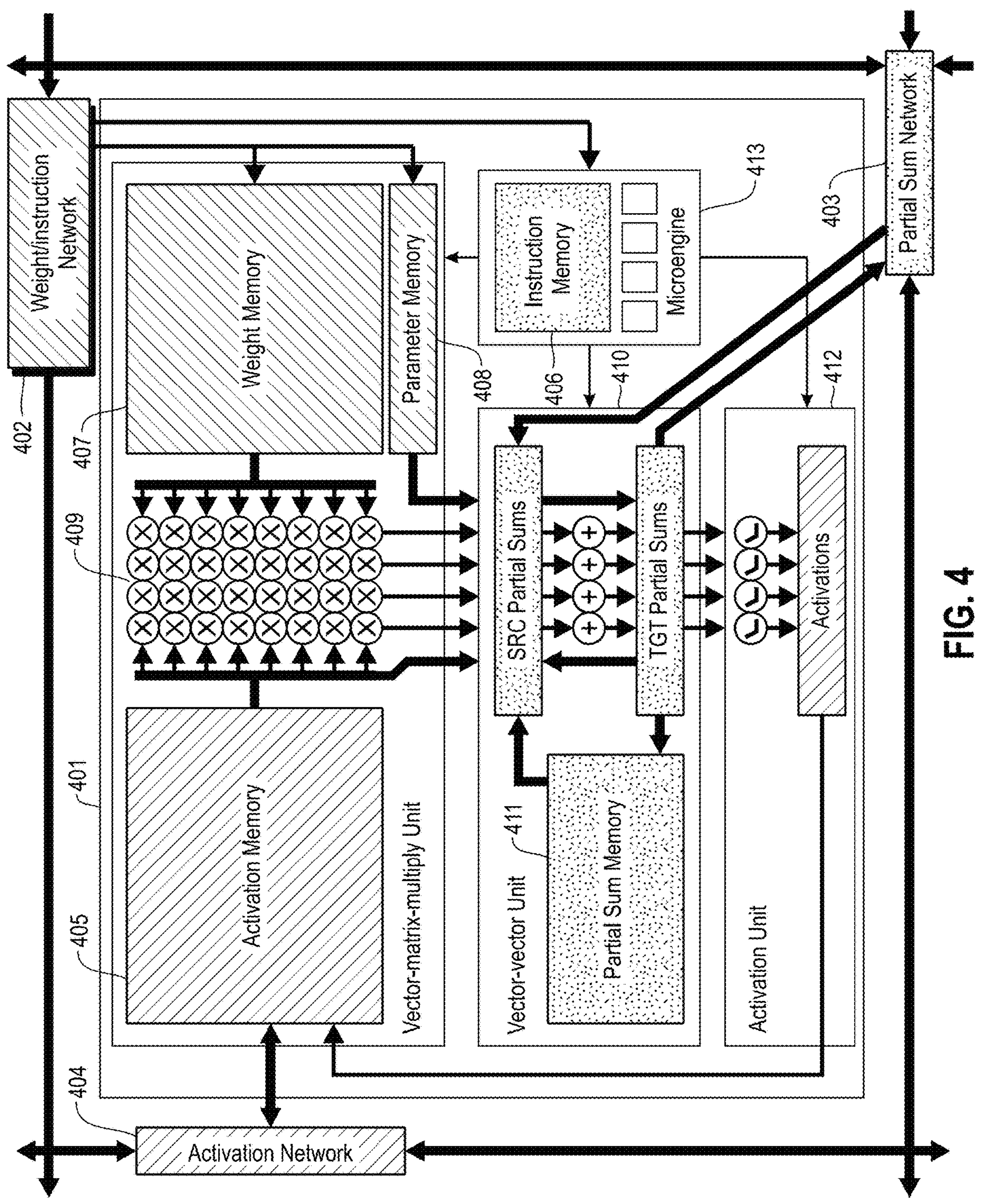
FIG. 4 illustrates a neural core and associated networks according to embodiments of the present disclosure.

With reference now to FIG. 4, an exemplary neural core and associated networks are illustrated according to embodiments of the present disclosure. Core 401, which may be embodied as described with reference to FIG. 1 is interconnected with additional cores by networks 402 . . . 404. In this embodiments, network 402 is responsible for distributing weights and/or instructions, network 403 is responsible for distributing partial sums, and network 404 is responsible for distributing activations. However, it will be appreciated that the various embodiments of the present disclosure may combine these networks, or further separate them into multiple additional networks.

Input activations (X) are distributed core 401 from off-core via activation network 404 to activation memory 405. Layer instructions are distributed to core 401 from off-core via weight/instruction network 402 to instruction memory 406. Layer weights (W) and/or parameters are distributed to core 401 from off-core via weight/instruction network 402 to weight memory 407 and/or parameter memory 408.

The weight matrix (W) is read from weight memory 407 by Vector Matrix Multiply (VMM) unit 409. The activation vector (V) is read from activation memory 405 by Vector Matrix Multiply (VMM) unit 409. Vector Matrix Multiply (VMM) unit 409 then computes vector-matrix multiplication $Z=X^TW$ and provides the result to Vector-Vector unit 410. Vector-Vector unit 410 reads additional partial sums from partial sum memory 411, and receives additional partial sums from off-core via partial sum network 403. A vector-vector operation is computed by Vector-Vector unit 410 from these source partial sums. For example, the various partial sums may in turn be summed. The resulting target partial sums are written to partial sum memory 411, sent off-core via partial sum network 403, and/or fed back for further processing by Vector-Vector unit 410.

The partial sum results from Vector-Vector unit 410, after all computation for a given layer's inputs is complete, are provided to activation unit 412 for the computation of output activations. The activation vector (Y) is written to activation memory 405. Layer activations (including the results written to activation memory) are redistributed across cores from activation memory 405 via activation network 404. Upon receipt, they are written to local activation memory to each receiving core. Upon completion of processing for a given frame, the output activations are read from activation memory 405 and sent off-core via network 404.

Accordingly, in operation, a core control microengine (e.g., 413) orchestrates the data movement and computation of the core. The microengine issues a read activation memory address operation to load an input activation block into the vector-matrix multiply unit. The microengine issues a read weight memory address operation to load a weight block into the vector-matrix multiply unit. The microengine issues the vector-matrix multiply unit a compute operation, causing the vector-matrix multiply unit to compute a partial sum block.

The microengine issues one or more of a partial sum read/write memory address operation, vector compute operation, or partial sum communication operation in order to do one or more of the following: read partial sum data from partial sum sources; compute using partial sums arithmetic units; or write partial sum data to partial sum targets. Writing partial sum data to partial sum targets may include communicating external to the core via the partial sum network interface or sending partial sum data to the activation arithmetic unit.

The microengine issues an activation function compute operation, such that the activation function arithmetic unit computes an output activation block. The microengine issues a write activation memory address and the output activation block is written to the activation memory via the activation memory interface.

Accordingly, a variety of sources, targets, address types, computation types, and control components are defined for a given core.

Sources for vector-vector unit 410 include Vector Matrix Multiply (VMM) unit 409, constants from parameter memory 408, partial sum memory 411, partial sum results from prior cycles (TGT partial sums); and partial sum network 403.

Targets for vector-vector unit 410 include partial sum memory 411, partial sum results for subsequent cycles (SRC partial sums), activation unit 412, and partial sum network 403.

Accordingly, a given instruction may read or write from activation memory 405, read from weight memory 407, or read or write from partial sum memory 411. Compute operations performed by the core include vector matrix multiplication by VMM unit 409, vector (partial sum) operations by vector-vector unit 410, and activation functions by activation unit 412.

Control operations include updating program counters and loop and/or sequence counters.

Thus, memory operations are issued to read weights from addresses in weight memory, read parameters from addresses in parameter memory, read activations from addresses in activation memory, and read/write partial sums to addresses in partial sum memory. Computation operations are issued to perform vector-matrix multiplication, vector-vector operations, and activation functions. Communication operations are issued to select the vector-vector operands, route messages on the partial sum network, and select partial sum targets. Loops over layer outputs and loops over layer inputs are controlled by control operations specifying program counters, loop counters, and sequence counters in microengines.

It will be appreciated that to accommodate various program constructs, it is advantageous to provide a microengine capable of efficient program control of nested loops. Accordingly, the following discussion provides various exemplary embodiments of a suitable microengine.

In accordance with an aspect of the disclosure, a mechanism for efficient massively-concurrent condition computation is provided. Conditional computation allows for the selection of an action to perform based on one or more conditions. An exemplary code block is as follows:

```
if (statement) then
// perform an action
else if (other statement) then
// perform a different action
...
else
// perform a fallback action
```

Figure 5:
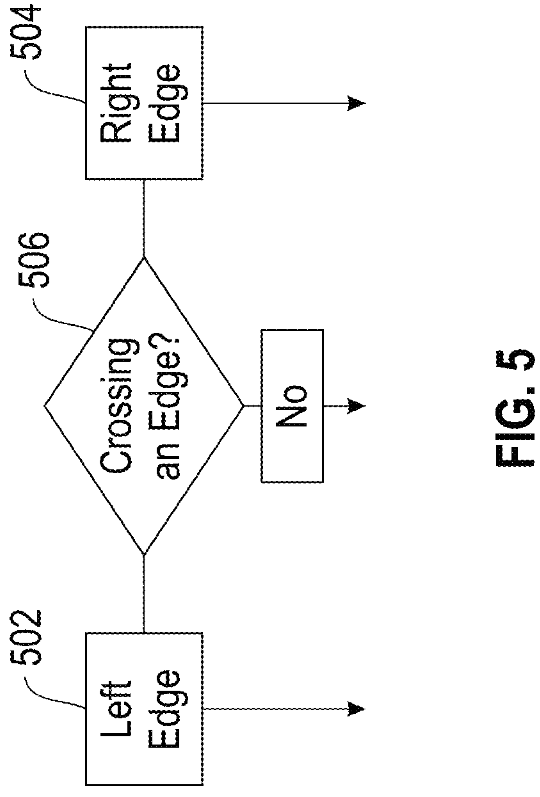
FIG. 5 illustrates an exemplary flow chart from convolution, according to embodiments of the present disclosure.

The action that is taken when performing this operation is called a "branch". Referring now to FIG. 5, an exemplary flow chart is provided, which presents three distinct factors in the decision: determining if the operation is at the left edge 502, at the right edge 504, and an evaluation of whether the operation is moving left, or right, at 506. This exemplary problem ultimately presents sixteen cases to evaluate, ideally within a single cycle, as illustrated further in FIGS. 13 and 19, below.

FIG. 6 depicts an exemplary decision tree, with a serial (single decision at one time) technique shown in 602, and a parallel (multiple simultaneous decisions) technique shown in 604. Complex decisions benefit from hardware support by reducing necessary cycles. Also, in parallel computation, avoidance of synchronization can further improve efficiency. As shown in FIG. 7, a first time computation path 701 is depicted in which synchronization is not needed. Here, the completion time is predictable and there is no need to announce arrival or wait at output 703, so additional processing can continue uninhibited. In contrast, the approach shown in 702 has unknown completion time. Consequently, synchronization is required. Consequently, the completion time is unknown, as there is a need to announce arrival and wait at output 704, thereby inhibiting additional processing. Thread synchronization is an exemplary synchronization technique where two processors working in parallel can: i) signal each other when they are done (which requires significant hardware resources); and/or ii) wait long enough to guarantee that the other processor will complete its task (which requires that the exact time for each task be known a-priori).

FIG. 8 depicts a flowchart of a conditional jump approach to conditional execution with two branches 802, 804. Upon evaluating the instruction at 803, if the condition is true, the process flows through branch 802 and advances, or "jumps" to the code for calculating the corresponding designated operation. If the condition is false, the process flows through branch 804 and advances, or "jumps" to the code for calculating the corresponding designated operation. These conditional jump approaches can be implemented in a variety of systems, some exemplary ones are depicted in FIG. 8.

Figure 9:
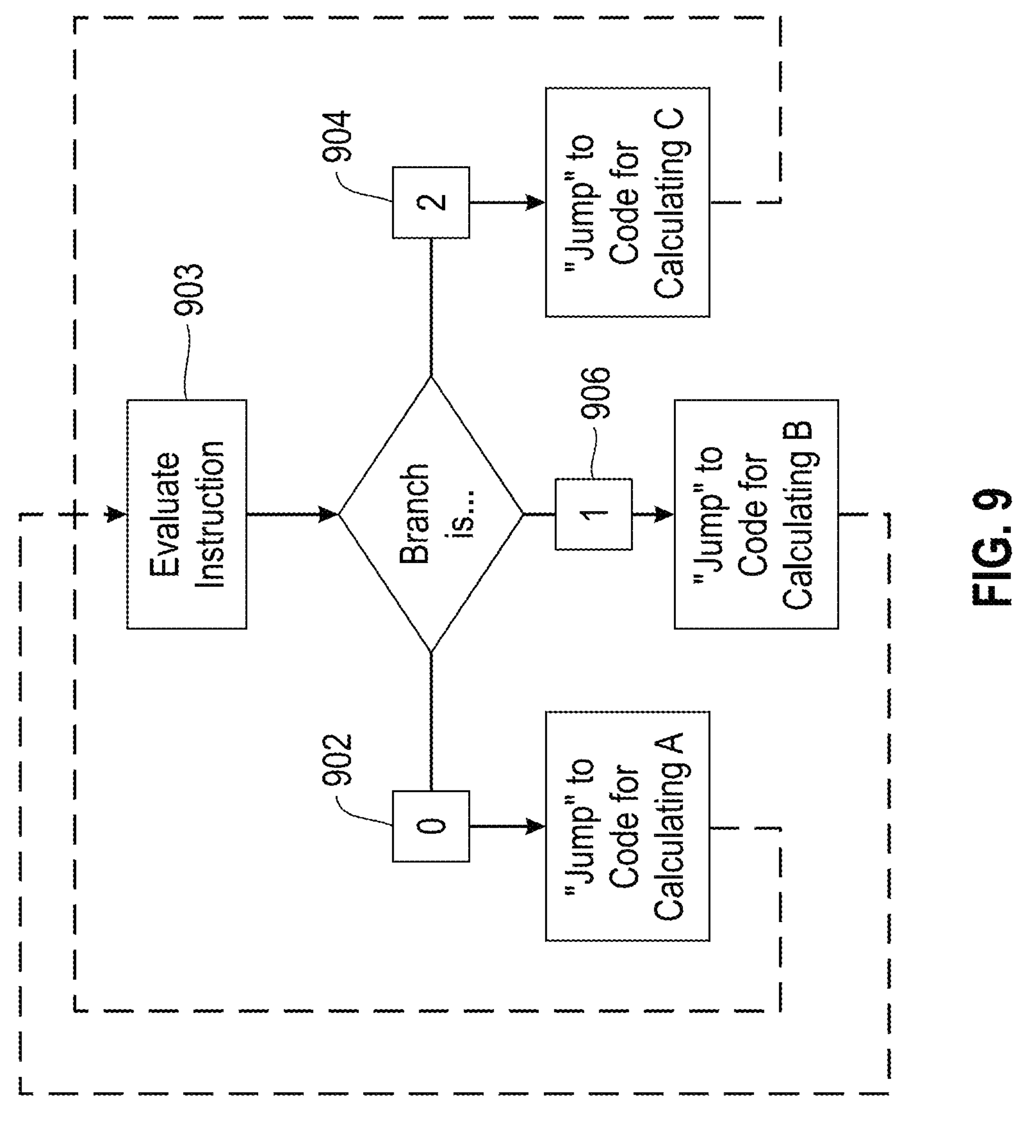
FIG. 9 illustrates another exemplary conditional jump approach, according to embodiments of the present disclosure.
Figure 10:
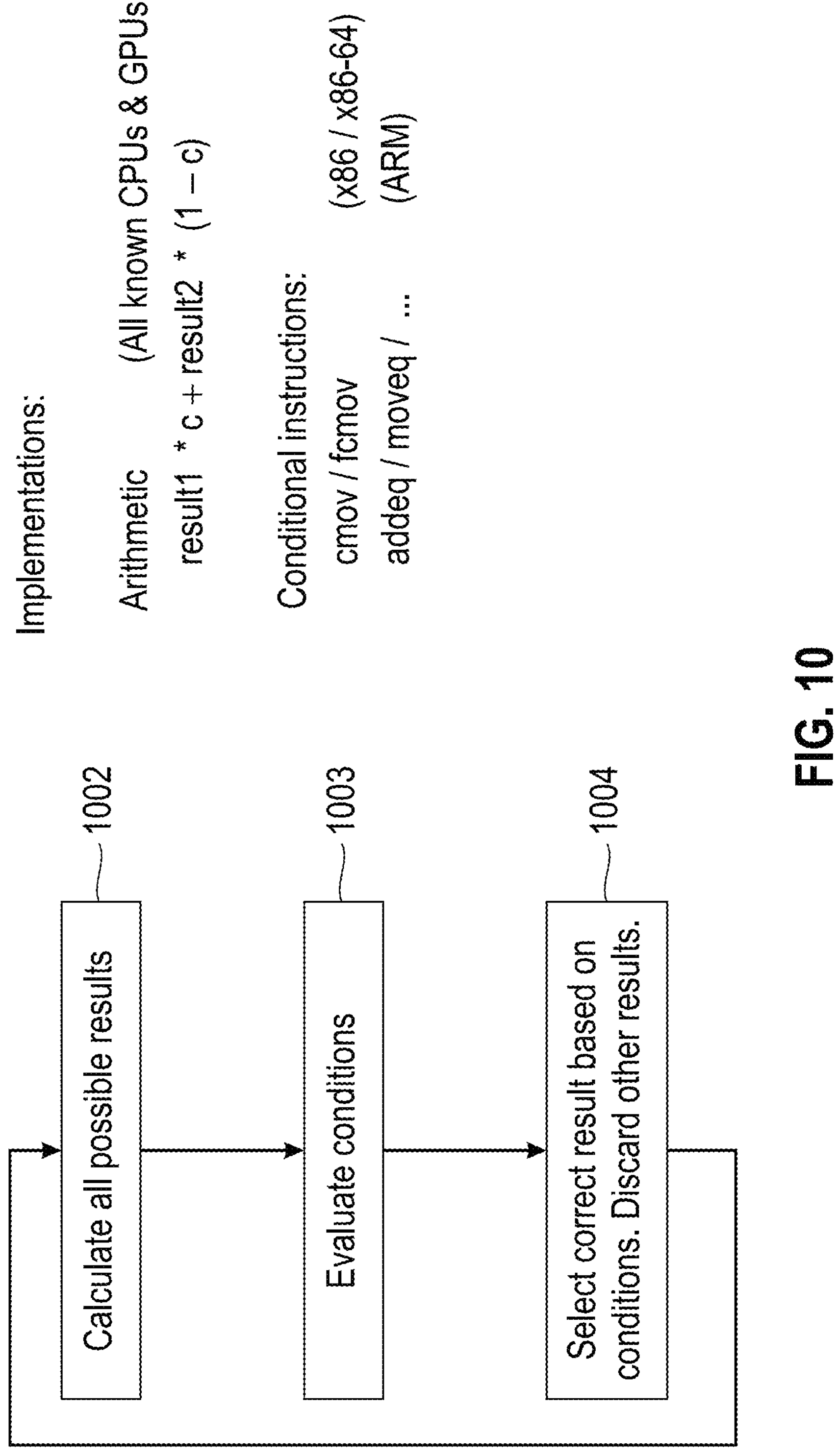
FIG. 10 illustrates an exemplary Kronecker delta approach, according to embodiments of the present disclosure.

FIG. 9 depicts a flowchart of a conditional jump approach using a look up table (LUT). This approach can be employed when there are more than two branches presented. Upon evaluating the instruction at 903, if the condition is 0, the process flows through branch 902 and advances, or "jumps" to the code for calculating the corresponding designated operation "A". If the condition is 1, the process flows through branch 906 and advances, or "jumps" to the code for calculating the corresponding designated operation "B". If the condition is 2, the process flows through branch 904 and advances, or "jumps" to the code for calculating the corresponding designated operation "C". FIG. 10 depicts a flowchart of a Kronecker delta approach using any number of branches. In such approaches, all possible results are calculated at 1002, then the conditions are evaluated at 1003, and the correct results are selected (with the remaining results discarded/deleted) at 1004. The Kronecker delta approach can be implemented in a variety of systems, some exemplary ones are depicted in FIG. 10.

The conditional jump approach presents a variety of attributes or characteristics, including, the control flow can be changed in order to match the problem. Also, non-trivial (e.g. branching) control flow can interfere with branch prediction, and require flushing the instruction pipeline. Time and power are generally proportional to computation performed, with the result set of computations being almost entirely useful. Additionally, the conditional jump approach can present unpredictable timing, and require synchronization.

The Kronecker delta approach presents a variety of attributes or characteristics, including, computing all outcomes, then discard all except one. This approach is employed on trivial (e.g., non-branching) control flows and can provide perfect branch prediction. Time and power demands are proportional to total instructions across all branches, with the result set almost entirely wasted. While previously-existing conditional instructions (e.g., cmov, addeq) can save power, they do not save time. Additionally, the Kronecker delta approach requires that timing be known a-priori, and supports timing-based synchronization.

In accordance with an aspect of the disclosure, a unique approach for high efficiency in massively-concurrent computation is presented which simultaneously provides: trivial (non-branching) control flow (with perfect branch prediction); time proportional to longest computation (where shorter branches can be extended to match time of longest branch); power proportional to computation performed (so power is not wasted on discarded calculations); and timing known a-priori (thus supports timing-based synchronization).

Figure 11:
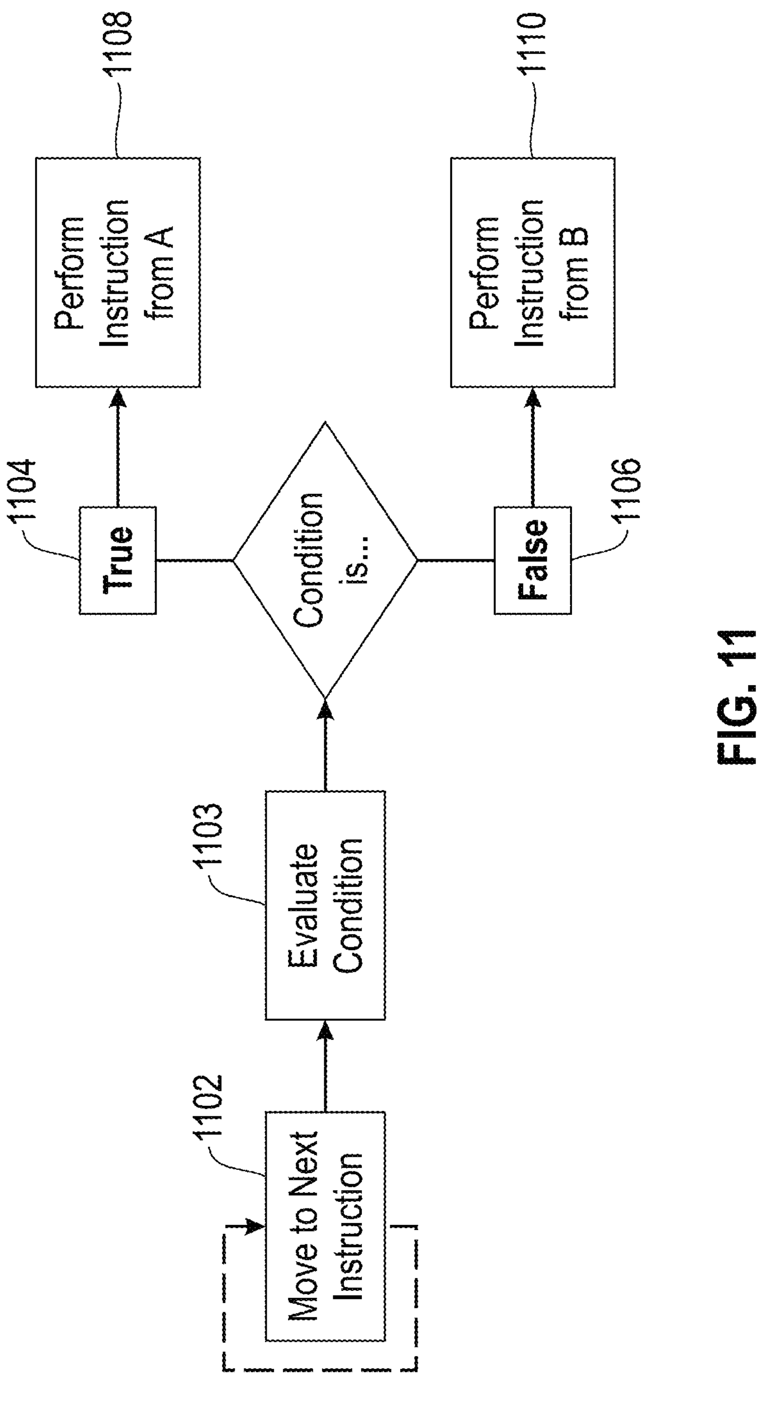
FIGS. 11-13 illustrate exemplary concurrent conditional computation techniques, according to embodiments of the disclosure.

FIG. 11 depicts an exemplary embodiment of the present disclosure, with an instructional loop 1102, condition evaluation step 1103, and distinct pathways 1104, 1106 for true and false condition outcomes routing to the corresponding instructions 1108, 1110, respectively. As shown, conditions are separated from the instruction stream as follows:

- N conditions
  - A value of 1 is to be used if the condition is true, or 0 if it is false.
- Conditional instructions comprise:
  - References to M of the N conditions, where M≥1.
- A function $f$ mapping from states of M conditions either to an operation that is to be performed (OP), or to no operation (No-OP).
- When a conditional instruction is to be executed:
  - The states $c_1, \ldots, c_M$ of the M referenced conditions are queried.
  - The OP or No-OP $f(c_1, \ldots, c_M)$ is performed.

Figure 12:
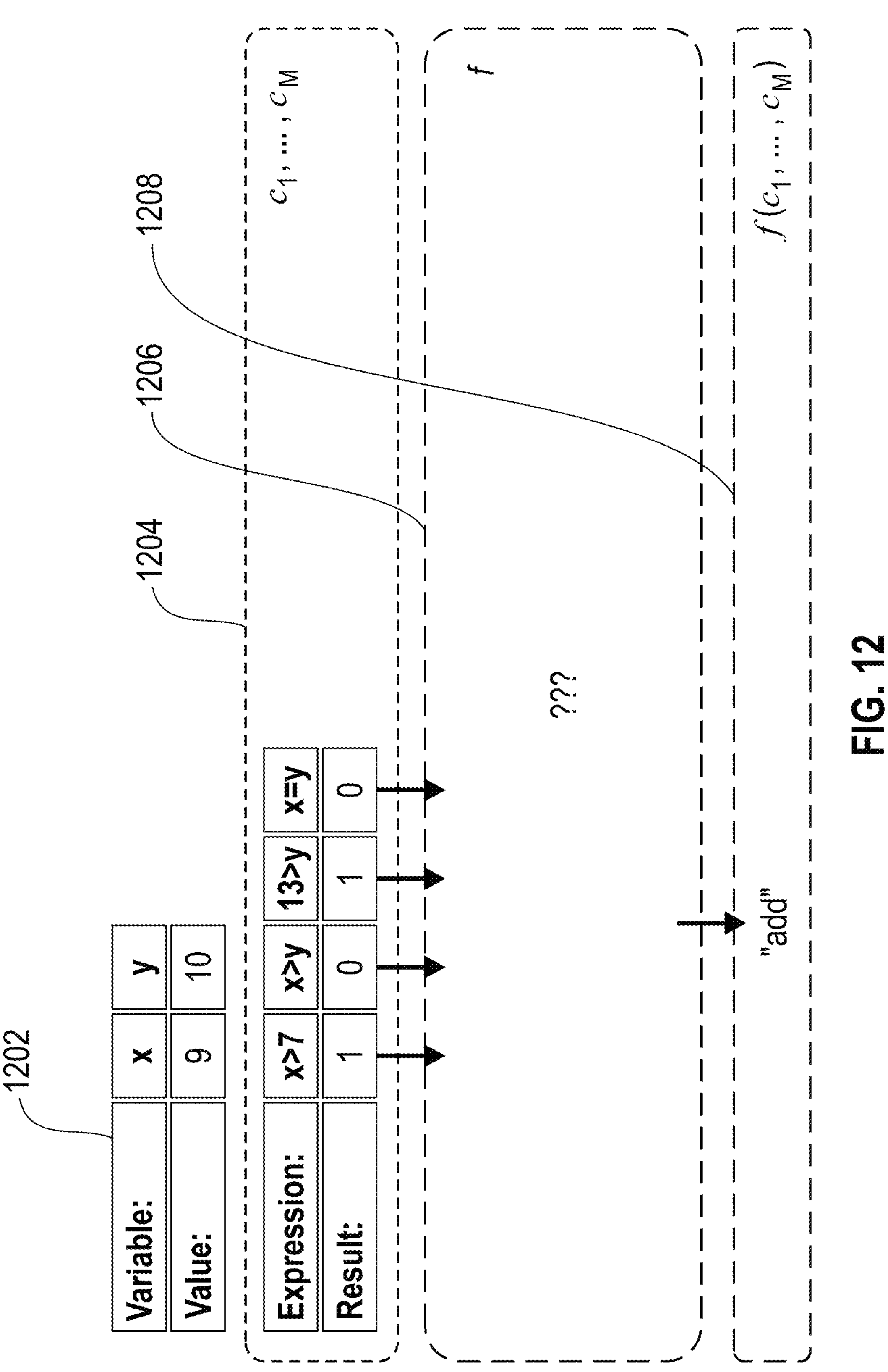

In the exemplary embodiment shown in FIG. 12, a two variable example is presented, where the value of X=9 and Y=10 as shown in block 1202, and the expressions of the conditions are listed in 1204 with function mapping provided at 1206 and the conditional operators 1208.

In some embodiments, N conditions can be included, with values computed in parallel at each cycle—e.g., a value of 1 is used if the condition is true, or 0 if it is false. The instructions can comprise:

- References to M of the N conditions.
- A reference to a Look-Up Table (LUT), each entry of which refers either to an operation that is to be performed (OP), or to no operation (No-OP).

When an instruction is to be executed:

- The states $c_1, \ldots, c_M$ of the M referenced conditions are queried.
- An index into the LUT is constructed by the formula $$\text{index} = \sum_{i=1}^{M} 2^{i-1} c_i.$$

- The OP or No-OP at the indexed location in the referenced LUT is performed.

In the exemplary implementation illustrated, N=32 and M=4.

Figure 13:
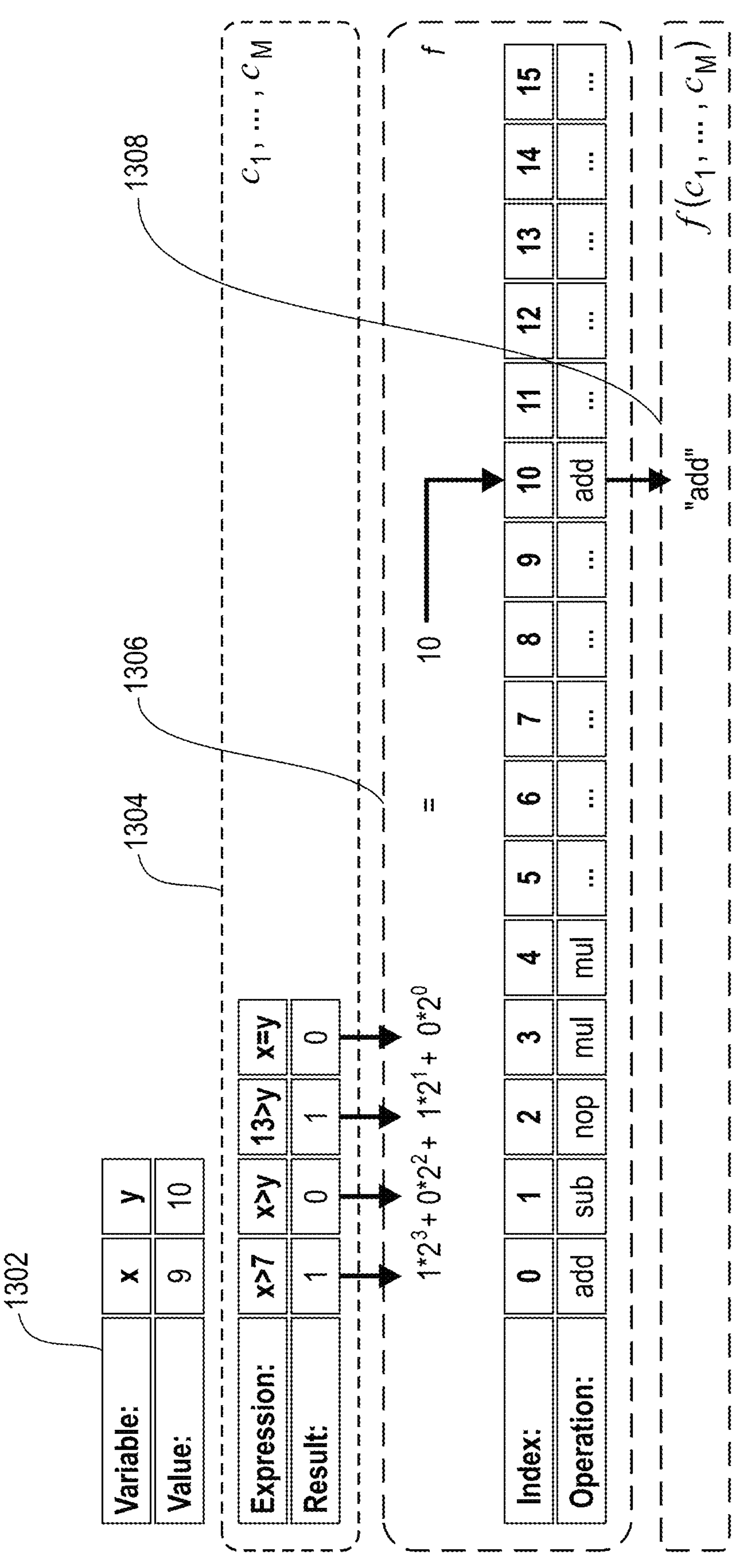

In the exemplary embodiment shown in FIG. 13, a two variable example is presented, where the value of X=9 and Y=10 as shown in block 1302, and the expression of the conditions are listed in 1304, with function mapping 1306 and conditional operators at 1308.

The implementation steps of the present disclosure include: generating a sequence of program counter (PC) values. This can be completely independent of the outcome of the conditional operations (Ops) described herein. For each PC value, the PC can be used to select a function-which will in turn select those conditions that it employs. Additionally, for each PC value, the conditions can be evaluated, with an application of the function to the values resulting from the conditions. Further, for each PC value, the operation that is returned by the function can be performed. In some embodiments, the conditions can be computed at a given time regardless of whether they are used at that time.

In an exemplary embodiment, a conditional operation (OP) problem statement can be employed. Here, the Loop control does not have conditional branching (other than the loop itself), e.g. "if-then-else". This embodiment can be advantageous in that it can provide deterministic execution, and can avoid pipeline stalls (e.g. for branching). Such embodiments also address compression, and provide an ability to code similar programs with minor variations between execution streams with the same code. Accordingly, this technique affords massive savings in the number of instructions in memory. These embodiments can be employed across a wide scope of applications, including: Conditioned on variables (VARs)/loop controls (LCs)/registers (REGs); as well as choosing between data operators (DATA_Ops). Additionally, conditional operations (or COND_Ops) have no effect on Program Counter or Loop Controls (LC).

Figure 14:
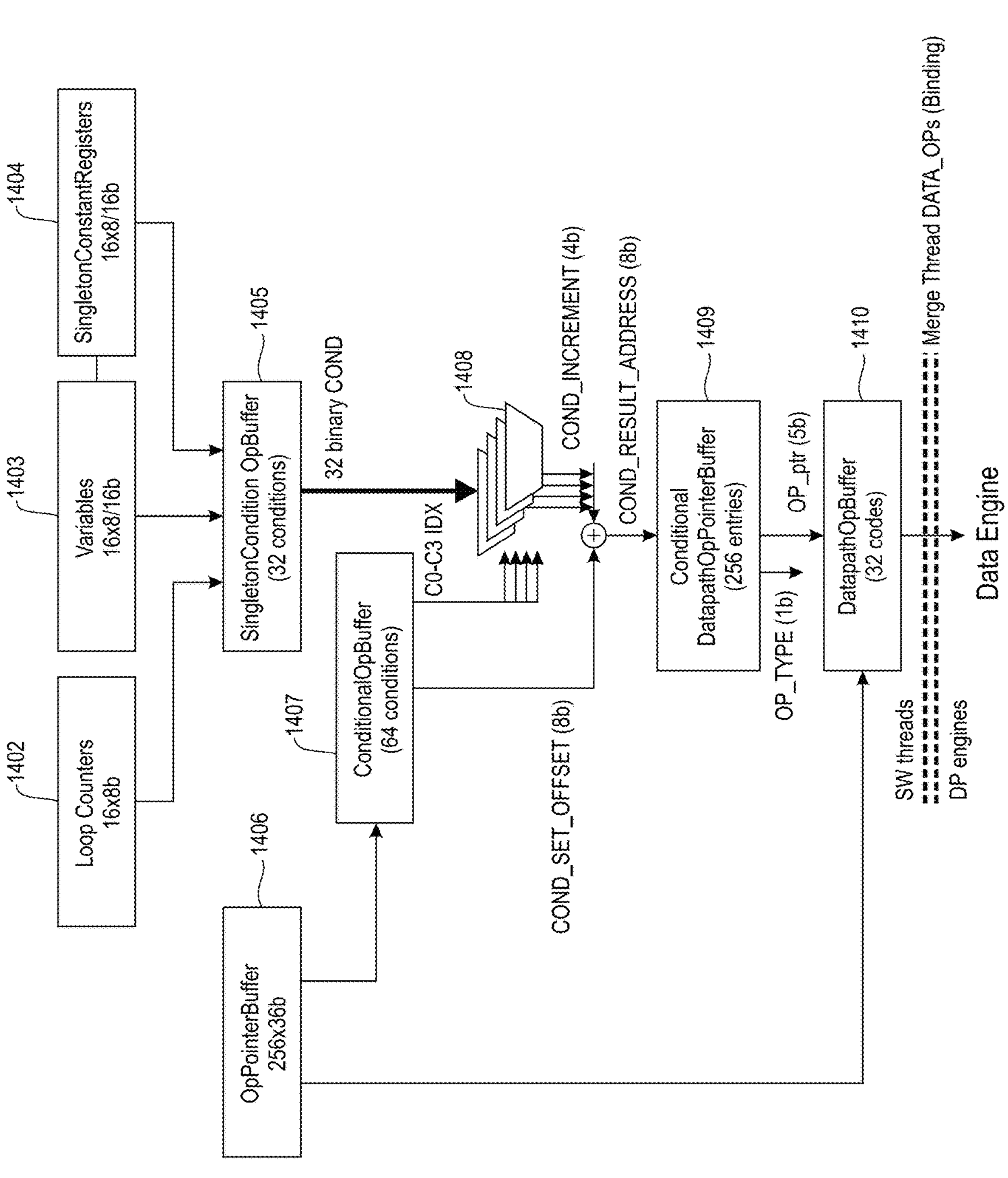
FIG. 14 illustrates another exemplary conditional operation, according to embodiments of the disclosure.

FIG. 14 illustrates the causality of the exemplary conditional operation (OP) embodiment described above. A Loop Counter 1402, Variables 1403, and Singleton Constant Registers 1404 are communicated with a Singleton Condition Op Buffer 1405. The Loop Counter 1402, Variables 1403, and Singleton Constant Registers 1404 can be configured in a variety of sizes and formats, in the exemplary embodiment shown Loop Counter 1402 is configured as 16×8b; while the Variables 1403, and Singleton Constant Registers 1404 are configured as 16×8/16b. The Singleton Condition Op Buffer 1405 can be formatted as (32×16b):

- OP (2b), VAR1 (6b), VAR0 (6b)
- OP {=, >, >=, !=}
- VAR0,1∈{Loop Counters, Variables, Singleton Constant Registers}

Additionally, the Singleton Condition Op Buffer 1405 can include a plurality of conditions, e.g., in an exemplary embodiment 32 conditions can be implemented.

Also included in the exemplary embodiment shown in FIG. 14, is an Operation Pointer Buffer 1406 which communicates with Conditional Operation Buffer 1407. The Operation Pointer Buffer 1406 can be configured as 25×36b, while the Conditional Operation Buffer 1407 can be formatted as (28b):

- [C0_IDX (5b), C1_IDX (5b), C2_IDX (5b), C3_IDX (5b), COND_SET_OFFSET (8b)]
- forms pointer into Conditional Datapath Op Pointer Buffer 1409
- performs parallel evaluation of up to four conditions The Conditional Operation Buffer 1407 can include a plurality of conditions, e.g., in an exemplary embodiment 64 conditions can be implemented.

The Singleton Condition Op Buffer 1405 can incrementally advance through the conditions presented, as shown in 1408, and include a condition set offset value provided by Conditional Operation Buffer 1407 for input to a Conditional Datapath Op Pointer Buffer 1409, as shown. The Conditional Datapath Op Pointer Buffer 1409 can be configured as:

256 entries, with variable entries per condition set 5b pointer to DATA_OP+1b OP_TYPE The output of the Conditional Datapath Op Pointer Buffer 1409 can be provided to the Datapath Op Buffer 1410, which in turn can be configured as having 32 datapath instructions to choose from.

The output from the Datapath Op Buffer 1410 can include a (binding) merge of SW threads and DP engines, as shown. Also, for purpose of illustration and not limitation, some exemplary approximate memory requirements for the components described herein are as follows:

64B=32×16b: Singleton Condition Op Buffer 1405.

224B=64×28b: Conditional OP Buffer 1407

160B=256×6b: Conditional Datapath Op Pointer Buffer 1409

160B=32×40b: Datapath Op Buffer (Vector Vector threads) 1410

In accordance with an aspect of the disclosure, a conditional Op can be provided. Data Operations (DATA_Ops) can be stored in the Datapath Op Buffer 1410, and can be selected either directly, using a datapath op pointer stored in the Op Pointer Buffer 1409, or indirectly, using a datapath op pointer constructed by combining up to 4 singleton conditions specified by a conditional op. A singleton condition is a comparison between two variables, which can be loop counters, subindex variables, or immediate values that are configured either by the user or by hardcoded constants. In some embodiments, up to 4 singleton conditions can be combined into a condition set, defining a truth table where each entry can select a different DATA_OP. In accordance with the present disclosure, a conditional Op has the following sequence:

- The program counter selects a conditional Op pointer, located in the Op Pointer Buffer 1406.
- The conditional op pointer in the Op Pointer Buffer 1406 selects a conditional Op, located in the Conditional Op Buffer 1407.
- The conditional Op in the Conditional Op Buffer 1407 selects up to 4 singleton condition definitions, located in the Singleton Condition Op Buffer 1405. The current binary states of the singleton conditions are combined with an offset to construct a pointer into the truth table of a condition set, located in the Conditional Datapath Op Pointer Buffer 1409.
- The condition set in the Conditional Datapath Op Pointer Buffer 1409 is a list of pointers into the Datapath Op Buffer 1410 that specify which DATA_OP to execute for each entry in the truth table.

FIG. 15 depicts an exemplary singleton condition Op definition 1502, which can be in 16b format and have a Buffer size: 32×16b=64B, statically assigned. As shown at 1504, a table of "CMPR_OP" listings can be provided where VAR1 and VAR0 are 8b/16b values. When comparing variables of different data type (e.g. VAR8b>VAR16b) the variables are zero padded (most significant bits) to the largest data type. Table 1506 depicts a plurality of "VARx INDEX" and corresponding "VARx Region" listings, where Singleton Constant Registers 1508 having values of 0 and 1 can be configured to the row and column core array index. Also in accordance with the present disclosure:

- Less than (LT) and less than or equal to (LEQ) are redundant with greater than (GT) and greater than or equal to (GEQ) by swapping VAR1 and VAR0.
- Always FALSE can be achieved by VAR1!=VAR1.

FIG. 16 depicts an exemplary singleton constant register definition 1602, where a width value of 8 and Bits value of 7:0 is employed for comparison with 8b VARs, and a width value of 16 and Bits value of 15:0 is employed for comparison with 16b VARs.

FIG. 17 depicts exemplary conditional Ops 1702, which can be formatted as 28b, with 64 conditional OPs in codebook (64×28b=224B). In operation, four singleton conditions (C0-C3 IDX) are selected to evaluate at 1703. The state of the four selected singleton conditions forms a 4b boolean vector "COND_INCREMENT". The selected singletons conditions are combined with the offset to form an address "COND_RESULT_ADDRESS" 1704 into the Conditional Datapath Op Pointer Buffer. Thus, in accordance with the present disclosure: COND_RESULT_ADDRESS (8b) =COND_SET_OFFSET (8b)+COND_INCREMENT (4b). With regards to address overflow, effectively "COND_INCREMENT" is zero padded to form an 8b value with the 4 most significant bits set to zero. As a result, the lower 4b naturally overflow into the upper bits. Also, the Conditional Datapath Op Pointer Buffer uses modulo addressing, so addresses >255 wrap around.

FIG. 18 depicts an exemplary Conditional Datapath Op Pointer Buffer 1802, which can be formatted with a buffer size of 256 entries×8b. In operation, the evaluated conditions create the "COND_RESULT_ADDRESS" which indexes into this buffer. For example, the "DATA_OP_PTR" 1803 from this buffer indexes into the Datapath Op Buffer containing the DATA_OP to execute. A variable number of entries for a given condition set are required based on the number of simultaneous conditions to evaluate, some examples include:

| | |
|---|---|
| 1 condition | → 2 entries, |
| 2 conditions | → 4 entries, |
| 3 conditions | → 8 entries, |
| 4 conditions | → 16 entries |

In an exemplary embodiment, 256 entries supports 16 condition sets of 4 conditions each. In accordance with an aspect of the disclosure, a condition set can be configured as a truth table for a given set of {1, 2, 3, or 4} conditions. The overall Conditional Datapath Op Pointer Buffer is partitioned into multiple condition sets. The "COND_SET_OFFSET" indexes the condition set to use within the Conditional Datapath Op Pointer Buffer, while the "COND_INCREMENT" indexes the truth table within the condition set.

Figure 19:
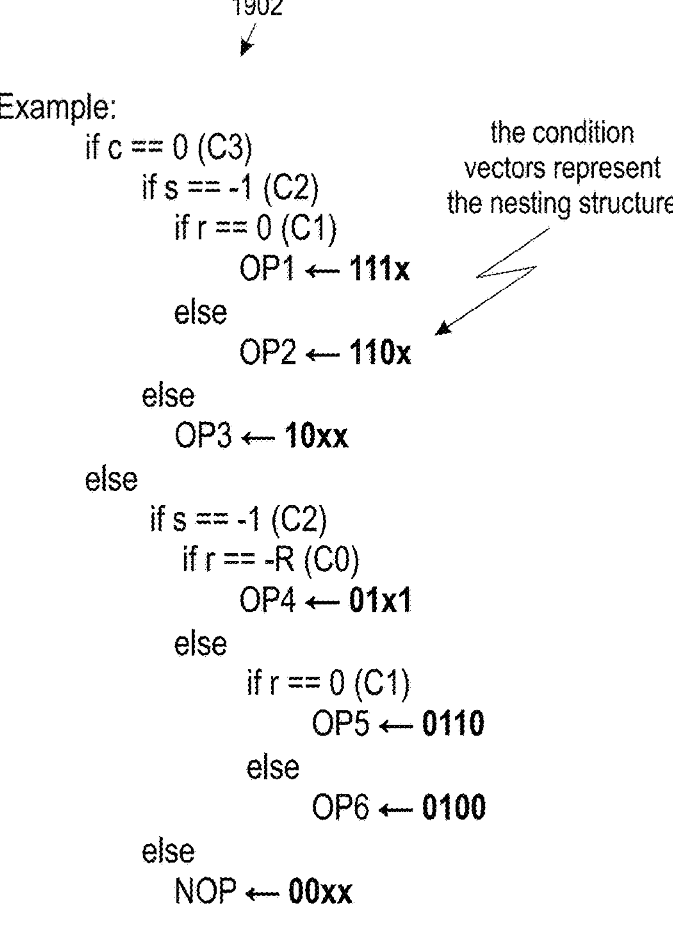
FIG. 19 illustrates an exemplary complex conditional mapping, according to embodiments of the disclosure.

FIG. 19 depicts an exemplary condition set having a complex conditional mapping, with code block 1902 having arbitrary nested IF statements (with the condition vectors highlighted in bold font to represent the nesting structure) represented as a truth table 1904 of boolean conditions.

Figure 20:
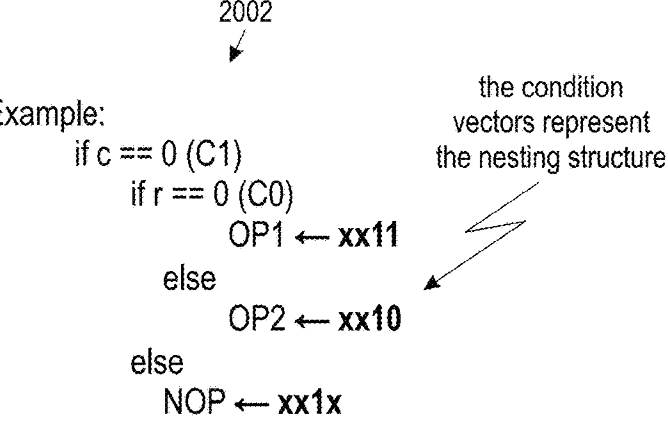
FIG. 20 illustrates an exemplary economized conditional mapping, according to embodiments of the disclosure.

FIG. 20 depicts an economized conditional mapping example 2002 where fewer than four singleton expressions are needed, some expressions are repeated. This reduces the part of the table 2004 that can be visited, and allows it to be used by a different conditional Op.

Figure 21:
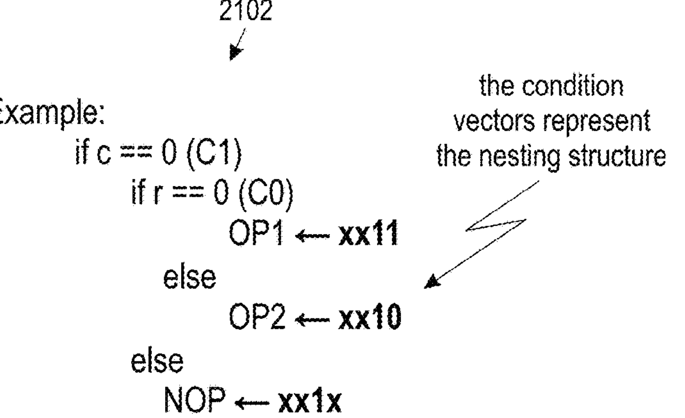
FIG. 21 illustrates another exemplary economized conditional mapping, according to embodiments of the disclosure.

FIG. 21 depicts another economized conditional mapping example 2102 where a singleton expression that is known to be false (here denoted ZV) may be used; this ensures contiguous entries in the table 2104.

Figure 22:
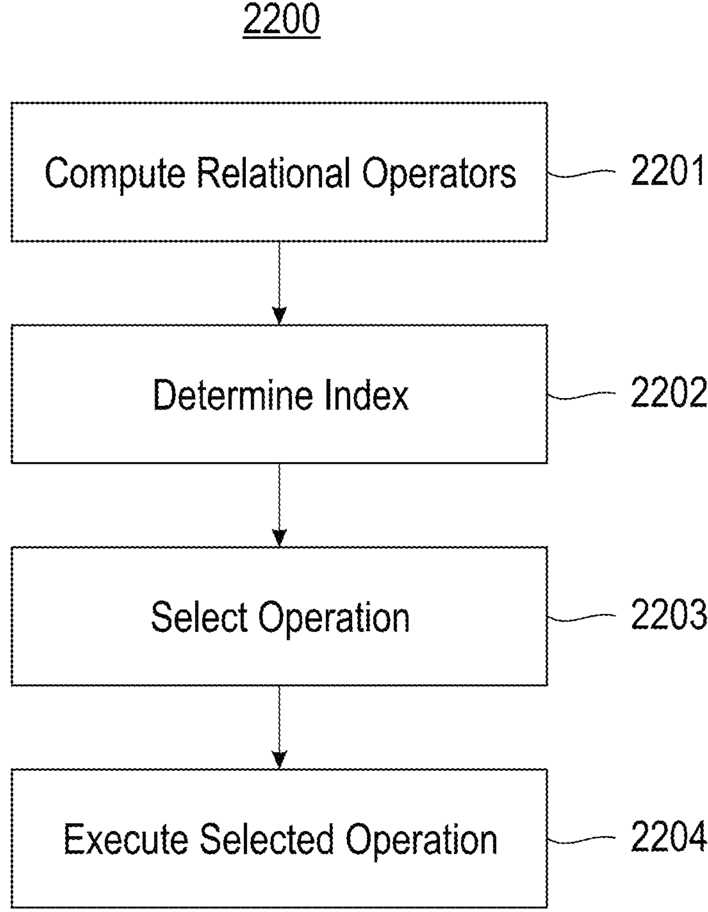
FIG. 22 illustrates a method for concurrent conditional computation, according to embodiments of the disclosure.

Referring to FIG. 22, a method for conditional computation is illustrated according to embodiments of the present disclosure. At 2201, a plurality of relational operators is concurrently computed on a plurality of inputs, resulting in a plurality of results. At 2202, the plurality of results is combined to determine an index. At 2203, an operation is selected based on the index. At 2204, the selected operation is executed by at least one processing core.

Figure 23:
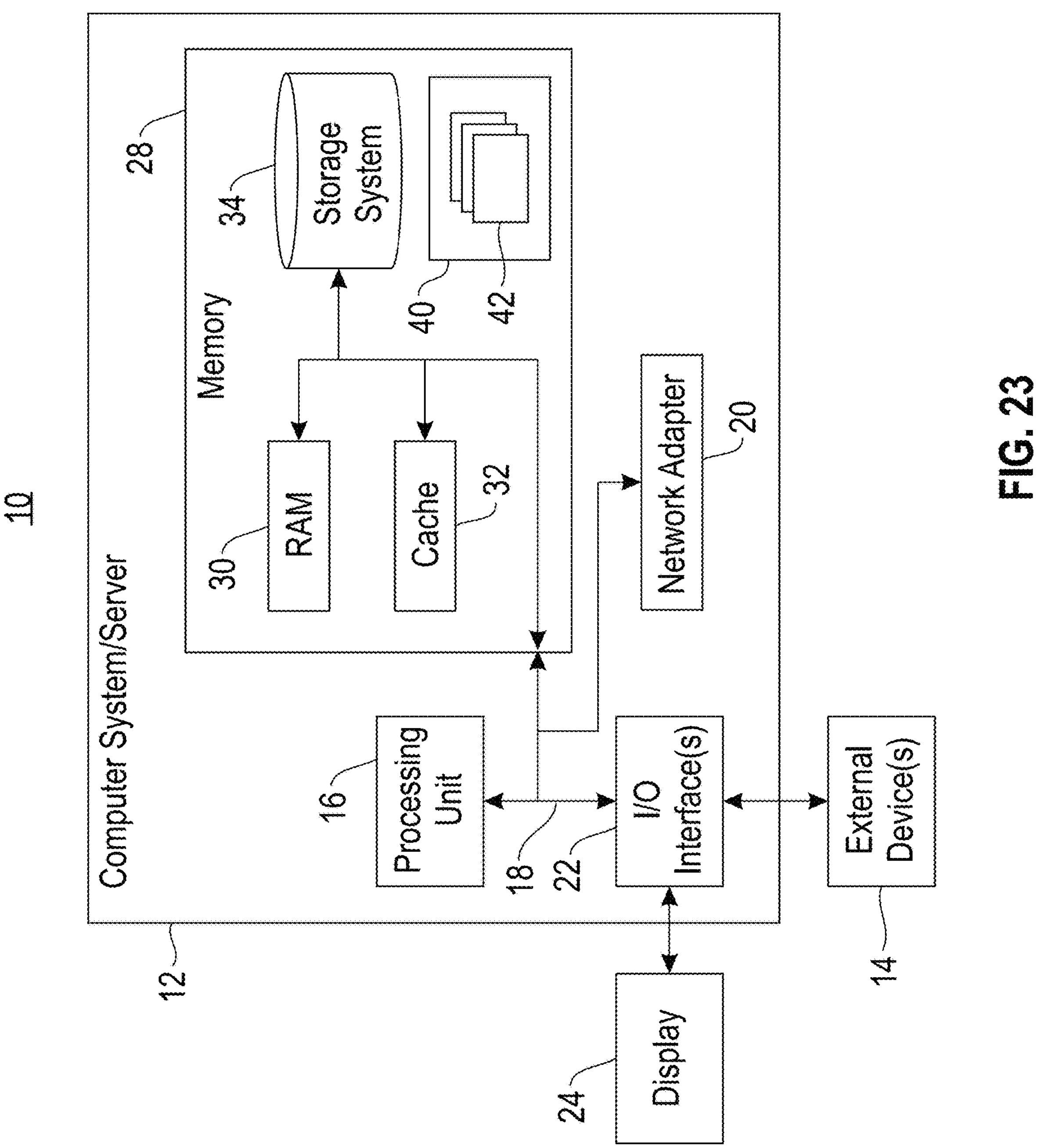
FIG. 23 illustrates a computing node according to embodiments of the disclosure.

Referring now to FIG. 23, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 23, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

In various embodiments, one or more inference processing unit (not pictured) is coupled to bus 18. In such embodiments, an IPU may receive data from or write data to memory 28 via bus 18. Likewise, an IPU may interact with other components via bus 18 as described herein.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A chip, comprising:

at least one processing core;

a controller circuit operatively coupled to the at least one processing core; and an instruction memory in communication with the controller circuit, the instruction memory having stored therein a program comprising a plurality of instructions, wherein the controller circuit is configured to:

select a conditional instruction from the plurality of instructions, the conditional instruction having a plurality of relational operators, wherein the plurality of relational operators comprises at least a first relational operator and a second relational operator different from the first relational operator;

concurrently compute the plurality of relational operators on a plurality of inputs, resulting in a plurality of results;

combine the plurality of results to determine an index;

select, using the index, from a lookup table, an operation, wherein the selected conditional instruction identifies the lookup table; and cause the at least one processing core to execute the selected operation.

2. The chip of claim 1, wherein the controller circuit is further configured to:

select the lookup table from a plurality of lookup tables.

3. The chip of claim 1, wherein selecting the operation comprises:

reading the conditional instruction from the instruction memory, the conditional instruction further identifying the plurality of relational operators.

4. The chip of claim 1, wherein the lookup table comprises a configurable memory or register.

5. The chip of claim 1, wherein the plurality of relational operators are binary operators.

6. The chip of claim 1, wherein combining the plurality of results comprises summing.

7. The chip of claim 1, wherein the at least one processing core comprises a plurality of neural inference units, neural computation units, tensor computation units, matrix multipliers, vector computation units, floating point units, integer arithmetic units, and logical computation units.

8. A method comprising:

selecting a conditional instruction from a plurality of instructions, the conditional instruction having a plurality of relational operators, wherein the plurality of relational operators comprises at least a first relational operator and a second relational operator different from the first relational operator;

concurrently computing the plurality of relational operators on a plurality of inputs, resulting in a plurality of results;

combining the plurality of results to determine an index;

selecting, using the index, from a lookup table, an operation, wherein the selected conditional instruction identifies the lookup table; and executing, by at least one processing core, the selected operation.

9. The method of claim 8, further comprising:

selecting the lookup table from a plurality of lookup tables.

10. The method of claim 8, wherein selecting the operation comprises:

reading the conditional instruction from an instruction memory, the conditional instruction further identifying the plurality of relational operators.

11. The method of claim 8, wherein the plurality of relational operators are binary operators.

12. The method of claim 8, wherein combining the plurality of results comprises summing.

13. The method of claim 8, wherein the at least one processing core comprises a plurality of neural inference units, neural computation units, tensor computation units, matrix multipliers, vector computation units, floating point units, integer arithmetic units, and logical computation units.

* * * * *